United States Patent [19]

Mishra et al.

[11] Patent Number: 5,563,118
[45] Date of Patent: Oct. 8, 1996

[54] MULTIFUNCTIONAL COPOLYMER AND LUBRICATING OIL COMPOSITION

[75] Inventors: Munmaya K. Mishra; Isaac D. Rubin, both of Wappingers Falls, N.Y.

[73] Assignee: DSM Copolymer, Inc., Baton Rouge, La.

[21] Appl. No.: 469,101

[22] Filed: Jun. 6, 1995

Related U.S. Application Data

[62] Division of Ser. No. 210,534, Mar. 18, 1994, Pat. No. 5,429,757, which is a continuation of Ser. No. 939,744, Sep. 2, 1992, abandoned.

[51] Int. Cl.$^6$ .................................................. C10M 149/06
[52] U.S. Cl. ...................... 508/454; 525/285; 525/382; 525/322; 525/353; 525/384; 525/321; 525/324
[58] Field of Search ..................... 252/51.5 A, 51.5 R; 525/285, 382, 322, 353, 384, 321, 324

[56] References Cited

U.S. PATENT DOCUMENTS

| | | | |
|---|---|---|---|
| 4,863,623 | 9/1989 | Nalesnik | 252/51.5 A |
| 5,013,469 | 5/1991 | DeRosa et al. | 252/51.5 A |
| 5,013,470 | 5/1991 | Benfaremo | 252/51.5 A |
| 5,094,766 | 3/1992 | Kapuscinski et al. | 252/51.5 A |
| 5,102,570 | 4/1992 | Migdal et al. | 252/51.5 A |
| 5,112,508 | 5/1992 | DeRosa | 252/51.5 A |
| 5,429,757 | 7/1975 | Mishra et al. | 252/51.5 A |

*Primary Examiner*—Prince Willis, Jr.
*Assistant Examiner*—Alan D. Diamond
*Attorney, Agent, or Firm*—Rockey, Rifkin and Ryther

[57] ABSTRACT

An additive composition comprising a graft and derivatized copolymer prepared from ethylene and at least one ($C_3$–$C_{10}$) alpha-monoolefin and, optionally, a polyene selected from non-conjugated dienes and trienes comprising from about 15 to 80 mole percent of ethylene, from about 20 to 85 mole percent of said ($C_3$–$C_{10}$) alpha-monoolefin and from about 0 to 15 mole percent of said polyene having an average molecular weight ranging from about 5,000 to 500,000, which has been reacted with at least one olefinic carboxylic acid acylating agent to form one or more acylating reaction intermediates characterized by having a carboxylic acid acylating function within their structure and reacting said reaction intermediate with an amino-aromatic compound to form said graft derivatized copolymer, and a lubricating oil composition containing same are provided.

20 Claims, No Drawings

MULTIFUNCTIONAL COPOLYMER AND LUBRICATING OIL COMPOSITION

This application is a division of U.S. Ser. No. 08/210,534, filed on Mar. 18, 1994, now U.S. Pat. No. 5,429,757 which is a continuation of U.S. Ser. No. 07/939,744 filed on Sep. 2, 1992, now abandoned.

BACKGROUND OF THE INVENTION

This invention relates to a process for manufacturing a novel multifunctional lubricant additive which is a VI improver, a dispersant, and an antioxidant additive when employed in a lubricating oil composition.

DISCLOSURE STATEMENT

The art contains many disclosures on the use of polymer additives in lubricating oil compositions. Ethylene-propylene copolymers and ethylene-alpha olefin non-conjugated diene terpolymers which have been further derivatized to provide multifunctional properties in lubricating oil compositions illustrate this type of oil additive.

U.S. Pat. No. 4,089,794 discloses ethylene copolymers derived from ethylene and one or more ($C_3$–$C_{28}$) alpha-olefins grafted with an ethylenically unsaturated carboxylic acid material followed by a reaction with a polyfunctional material reactive with carboxyl groups, such as a polyamine, a polyol, or a hydroxyamine which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graft copolymer where the backbone polymer is an oil-soluble ethylene-propylene copolymer or an ethylene-propylene-diene modified terpolymer with a graft monomer of N-vinyl-pyridine or N-vinylpyrrolidone to provide a dispersant VI improver for lubricating oils.

U.S. Pat. No. 4,320,019 discloses a multipurpose lubricating additive prepared by the reaction of an interpolymer of ethylene and a ($C_3$–$C_8$) alpha-monoolefin with an olefinic carboxylic acid acylating agent to form an acylating reaction intermediate which is then reacted with an amine.

U.S. Pat. No. 4,340,689 discloses a process for grafting a functional organic group onto an ethylene copolymer or an ethylene- propylene-diene terpolymer.

U.S. Pat. No. 4,357,250 discloses a reaction product of a copolymer and an olefin carboxylic acid via the "ene" reaction followed by a reaction with a monoamine polyamine mixture.

U.S. Pat. No. 4,382,007 discloses a dispersant-VI improver prepared by reacting a polyamine-derived dispersant with an oxidized ethylene-propylene polymer or an ethylene-propylene diene terpolymer.

U.S. Pat. No. 4,144,181 discloses polymer additives for fuels and lubricants comprising a grafted ethylene copolymer reacted with a polyamine, polyol or hydroxyamine and finally reacted with an alkaryl sulfonic acid.

The disclosures in the foregoing patents which relate to VI improvers and dispersants for lubricating oils; namely, U.S. Pat. Nos. 4,089,794, 4,137,185, 4,144,181, 4,146,489, 4,320,019, 4,340,689, 4,357,250, and 4,382,007 are incorporated herein by reference.

An object of this invention is to provide a novel derivatized graft copolymer composition. Another object of the invention is to provide a multi-functional lubricant additive effective for imparting viscosity index, dispersancy, and antioxidant properties to a lubricating oil composition.

A further object is to provide a novel lubricating oil composition containing the graft copolymer additive of the invention, as well as to provide concentrates of the novel additive of invention.

SUMMARY OF THE INVENTION

The novel reaction product of the invention comprises a copolymer or terpolymer of a ($C_3$–$C_{10}$) alpha-monoolefin, ethylene, and optionally, a non-conjugated diene or triene on which has been grafted an ethylenically unsaturated carboxylic function which is then further derivatized with an amino-aromatic compound such as nitrophenyl phenylenediamine represented by the formula

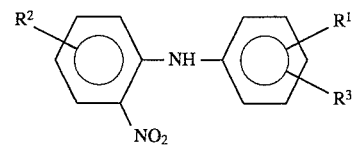

wherein $R^1$ is —$NH_2$, —$CH_2$—$(CH_2)n$—$NH_2$, —$CH_2$—aryl—$NH_2$ in which n has a value from 1 to 10, $R^2$ is hydrogen or a nitro group and $R^3$ is hydrogen or a nitro group.

The novel lubricant of the invention comprises an oil of lubricating viscosity and an effective dispersant, viscosity index improving, and antioxidant amount of the novel reaction product of the invention. Concentrates of the reaction product of the invention are also contemplated.

DETAILED DESCRIPTION OF THE INVENTION

The polymer or copolymer substrate employed in the novel additive of the invention may be prepared from ethylene and propylene or it may be prepared from ethylene and a higher olefin within the range of ($C_3$–$C_{10}$) alpha-monoolefins.

More complex polymer substrates, often designated as interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexa- diene,dicyclopentadiene, 5-ethylidene-2-norbornene, 5-methylene-2- norbornene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds, and up to about 30 carbon atoms in the chain. Typical trienes useful in preparing the interpolymer of the invention are 1-isopropylidene-3,4,7, 7a-tetrahydroindene, 1-isopropylidene dicyclopentadiene, and 2-(2-methylene-4-methyl-3-pentenyl)[2.2.1]bicyclo-5-heptene.

The polymerization reaction to form the polymer substrate may be carried out in the presence of a catalyst in a solvent medium. The polymerization solvent may be any suitable inert organic solvent that is liquid under reaction conditions for solution polymerization of monoolefins which is generally conducted in the presence of a Ziegler type catalyst. Examples of satisfactory hydrocarbon solvents include straight chain paraffins having from 5 to 8 carbon atoms, with hexane being preferred. Aromatic hydrocarbons, preferably aromatic hydrocarbons having a single benzene nucleus such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons or a suitable oil base stock. It is desirable that the solvent be free of substances that will interfere with a Ziegler polymerization reaction.

In a typical preparation of a polymer substrate, hexane is first introduced into a reactor and the temperature in the reactor is raised moderately to about 30° C. Dry propylene is fed to the reactor until the pressure reaches about 40–45 inches of mercury. The pressure is then increased to about 60 inches of mercury by feeding dry ethylene and 5-ethylidene-2-norbornene to the reactor. The monomer feeds are stopped and a mixture of aluminum sesquichloride and vanadium oxytrichloride is added to initiate the polymerization reaction. Completion of the polymerization reaction is evidenced by a drop in the pressure in the reactor.

The present invention relates to a process for the manufacture of a derivatized graft copolymer which is prepared from:

a polymer prepared from ethylene and at least one ($C_3$–$C_{10}$) alpha-monoolefin and, optionally, a polyene selected from non-conjugated dienes and trienes comprising from about 15 to 80 mole percent of ethylene, from about 20 to 85 mole percent of said ($C_3$–$C_{10}$) alpha-monoolefin, and from about 0 to 15 mole percent of said polyene and having a number average molecular weight ranging from about 5,000 to 500,000.

Ethylene-propylene or higher alpha-monoolefin copolymers may consist of from about 25 to 55 mole percent ethylene and from about 45 to 75 mole percent propylene or higher alpha monoolefin with the preferred mole ratios being from about 25 to 75 mole percent ethylene and from about 25 to 75 mole percent of a $C_3$–$C_{10}$ alpha monoolefin with the most preferred proportions being from 50 to 80 mole percent ethylene and 20 to 50 mole percent propylene.

Terpolymer variations of the foregoing polymers may contain from about 0 to 15 mole percent of polyene with the preferred mole ratio being 0.1 to 10 mole percent of a non-conjugated diene or triene. The polymer substrate, that is, the ethylene copolymer or terpolymer, is an oil-soluble, substantially linear, rubbery material broadly having a number average molecular weight from about 5,000 to 500,000, with a preferred molecular weight range of 25,000 to 250,000, and a most preferred range being from 50,000 to 150,000.

The terms polymer and copolymer are used generically to encompass ethylene copolymers, terpolymers or interpolymers. These materials may contain minor amounts of other olefinic monomers so long as their basic characteristics are not materially changed.

An ethylenically unsaturated carboxylic acid material is next grafted onto the prescribed polymer backbone. These materials which are attached to the polymer contain at least one ethylenic bond and at least one, preferably two, carboxylic acid or its anhydride groups or a polar group which is convertible into said carboxyl groups by oxidation or hydrolysis. Maleic anhydride or a derivative thereof is preferred. It grafts onto the ethylene copolymer or terpolymer to give two carboxylic acid functionalities. Examples of additional unsaturated carboxylic materials include chloromaleic anhydride, itaconic anhydride, or the corresponding dicarboxylic acids, such as maleic acid, fumaric acid and their monoesters.

The ethylenically unsaturated carboxylic acid material may be grafted onto the polymer backbone in a number of ways. It may be grafted onto the backbone by a thermal process known as the "ene" process or by grafting in solution or in solid form using a radical initiator. The free-radical induced grafting of ethylenically unsaturated carboxylic acid materials in solvents, such as benzene, is a preferred method. It is carried out at an elevated temperature in the range of about 100° C. to 250° C., preferably 120° C. to 190° C. and more preferably at 150° C. to 180° C., e.g., about 160° C., in a solvent, preferably a mineral lubricating oil solution containing, e.g., 1 to 50, preferably 5 to 30 weight percent, based on the initial total oil solution, of the ethylene polymer and preferably under an inert environment.

The free-radical initiators which may be used are peroxides, hydroperoxides, and azo compounds, and preferably those which have a boiling point greater than about 100° C. and decompose thermally within the grafting temperature range to provide free radicals. Representative of these free-radical initiators are azobis-isobutyronitrile and 5-dimethyl-hex-3-yne-2,5 bis-tertiary-butyl peroxide. The initiator is used in an amount of between about 0.005% and about 1% by weight based on the weight of the reaction mixture solution. The grafting is preferably carried out in an inert atmosphere, such as under nitrogen blanketing. The resulting polymer intermediate is characterized by having carboxylic acid acylating functions within its structure.

In the solid or melt process for forming a graft polymer, the unsaturated carboxylic acid with the optional use of a radical initiator is grafted on molten ethylene copolymer rubber using rubber masticating or shearing equipment. The temperature of the molten material in this process may range from about 150° C. to 400° C.

Polymer substrates or interpolymers are available commercially. Particularly useful are those containing from about 40 to about 60 mole percent ethylene units, about 60 to about 40 mole percent propylene units. Examples are "Ortholeum 2052" and "PL-1256" available from E. I. du Pont de Nemours and Co. The former is a terpolymer containing about 48 mole percent ethylene units, 48 mole percent propylene units and 4 mole percent 1,4-hexadiene units, having an inherent viscosity of 1.35. The latter is a similar polymer with an inherent viscosity of 1.95. The viscosity average molecular weights of the two are on the order of 200,000 and 280,000, respectively.

The polymer intermediate possessing carboxylic acid acylating functions is reacted with an amino-aromatic compound such as nitrophenyl phenylenediamine represented by the following general formula

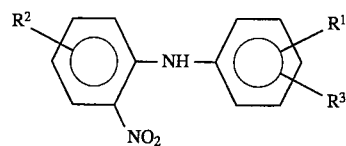

in which $R^1$ is —$NH_2$, —$CH_2$—$(CH_2)_n$—$NH_2$, —$CH_2$—aryl—$NH_2$ in which n has a value from 1 to 10, $R^2$ is hydrogen or a nitro group, and $R^3$ is hydrogen or a nitro group.

Particularly preferred amino-aromatic compound is N-(2,4- dinitrophenyl)1,4-phenylenediamine.

The reaction between the polymer substrate intermediate having grafted thereon carboxylic acid acylating function and the prescribed compound is conducted by heating a solution of the polymer substrate under inert conditions and then adding the compound to the heated solution generally with mixing to effect the reaction. It is convenient to employ an oil solution of the polymer substrate heated to 140° C. to 175° C. while maintaining the solution under a nitrogen blanket. The compound is added to this solution and the reaction is effected under the noted conditions.

The novel grafted and derivatized polymers of the invention are useful as an additive for lubricating oils. They are multifunctional additives for lubricants being effective in providing dispersancy, viscosity index improvement and antioxidant properties to lubricating oils. They can be employed in a variety of oils of lubricating viscosity including natural and synthetic lubricating oils and mixtures thereof. The novel additives can be employed in crankcase lubricating oils for spark-ignited and compression-ignited internal combustion engines. The compositions can also be used in gas engines or turbines, automatic transmission fluids, gear lubricants, metal-working lubricants, hydraulic fluids, and other lubricating oil and grease compositions. The base oils may be a natural oil including liquid petroleum oils and solvent-treated or acid-treated mineral lubricating oils of the paraffinic, naphthenic and mixed paraffinic-naphthenic types or synthetic or semisynthetic oils or blends thereof with natural oils. In general, the lubricating oil composition of the invention will contain the novel reaction product in a concentration ranging from about 0.5 to 10.0 weight percent. A preferred concentration range for the additive is from about 1 to 15 weight percent based on the total weight of the oil composition. Oil concentrates of the additives may contain from about 1 to 50 weight percent of the additive reaction product in a carrier or diluent oil of lubricating oil viscosity.

The novel reaction product of the invention may be employed in lubricant compositions together with conventional lubricant additives. Such additives may include additional dispersants, detergents, antioxidants, pour point depressants, antiwear agents, and the like.

The following examples illustrate the novel reaction product additive of the present invention and its use and properties.

EXAMPLE I

Twenty grams of solid maleic anhydride grafted ethylene-propylene polymer (rubber) in which the polymer substrate consisted of about 60 mole percent ethylene and 40 mole percent propylene having a number average molecular weight of about 100,000 on which has been grafted 0.8 weight percent of maleic anhydride was dissolved in 135 grams of solvent neutral oil at 160° C. with mechanical stirring while the mixture was maintained under a nitrogen blanket. After the rubber polymer had dissolved, mixing was continued for an additional hour at 160° C. 0.62 Gram of neat N-(2,4-dinitrophenyl) 1,4-phenylenediamine followed by 6.0 grams of low molecular weight ethylene oxide polymer (Surfonic L-24-7 manufactured by Texaco Chemical Co.) was added to the oil solution of the polymer and a reaction effected over three hours at 160° C. under nitrogen. The reaction mixture containing the derivatized graft polymer was then cooled and filtered. FTIR showed quantitative conversion.

EXAMPLE II

The novel additive reaction product of the invention was tested for its effectiveness as a dispersant and as an antioxidant.

The lubricating oil used in the dispersancy test was the typical formulated lubricating oil illustrated below in Table 1.

TABLE 1

| Parts by Weight Component | |
|---|---|
| Solvent neutral oil A | 75.25 |
| Solvent neutral oil B | 21.64 |
| Zinc dialkyldithiophosphate | 1.22 |
| 4,4'Dinonyldiphenylamine | .39 |
| Overbased magnesium sulfonate | 1.50 |
| Silicone antifoamant | 150 ppm |
| Product of Example I | 10 (1.25 wt % polymer) |

Oil A had asp. gr. 60°/60° F. of 0.858–0.868; Vis 100° F. 123–133; Pour Point 0° F. Oil B had a sp. gr. 60°/60° F. of 0.871–0.887; Vis. 100° F. 325–350; Pour Point +10° F. Zinc salt is a salt of mixed alcohols-isopropanol and $P_2S_5$ product as described in U.S. Pat. No. 3,292,181. The overbased magnesium sulfonate had a TBN of 395 and is a salt of a branched ($C_{20}$–$C_{40}$) monoalkylbenzene sulfuric acid (MW 530–540) together with about 10% magnesium carbonate, 14% magnesium hydroxide and 4% magnesium sulfate.

The dispersant properties of the additive-containing oil are determined in the Bench VE Dispersancy Test (BVET). Dispersancy of a lubricating oil is determined relative to three references which are the results from three standard blends tested along with the unknown. The test additives were blended into a formulated oil containing no dispersant. The additive reaction product was employed in the oil at a concentration of 1.25 weight percent based on the total weight of the oil composition. As shown below in Table 2, the numerical value of the test results decreases with an increase in effectiveness.

TABLE 2

| BENCH VE DISPERSANCY TEST | |
|---|---|
| | Additive Result |
| Example I | 53 |
| Maleic anhydride grafted EPM | 190 |
| Ethylene-Propylene Copolymer (EPM) | 200 |

EXAMPLE III

The antioxidant properties of the novel reaction product in a lubricating oil were determined in the Bench Oxidation Test. In this test, 1.5 weight percent of the additive reaction product is blended into solvent neutral oil (S.U.S. at 100° F. of 130). The mixture is continuously stirred while being heated accompanied by bubbling with air. Samples are withdrawn periodically for analysis by Differential Infrared Absorption (DIR) to observe changes in the intensity of the carboxyl vibration band at 1710 cm-1. A low carboxyl vibration band intensity indicates higher thermal-oxidative stability of the sample.

TABLE 3

| BENCH OXIDATION TEST | |
|---|---|
| | Additive Result |
| Example I | 4.3 |
| Maleic anhydride grafted EPM | 27.0 |
| Ethylene-Propylene Copolymer (EPM) | 15.0 |

What is claimed is:

1. A process for manufacturing a derivatized graft copolymer comprising the steps of:

(a) reacting a polymer prepared from ethylene and at least one ($C_3$–$C_{10}$) alpha-monoolefin and, optionally, a polyene selected from non-conjugated dienes and trienes comprising from about 15 to 80 mole percent of ethylene, from about 20 to 85 mole percent of said ($C_3$–$C_{10}$) alpha-monoolefin, and from about 0 to about 15 mole percent of said polyene and having a number average molecular weight ranging from about 5,000 to 500,000 with at least one olefinic carboxylic acid acylating agent to form one or more acylating reaction intermediates characterized by having a carboxylic acid acylating function within their structure; and (b) reacting said reaction intermediate in (a) with a nitrophenyl phenylenediamine represented by the general formula

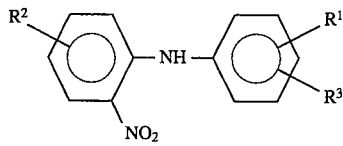

in which $R^1$ is —$NH_2$—$(CH_2)n$—$NH_2$, —$CH_2$aryl—$NH_2$ in which n has a value from 1 to 10, $R^2$ is hydrogen or a nitro group, and $R^3$ is hydrogen or a nitro group in the presence of a low molecular weight ethylene oxide polymer.

2. The process according to claim 1 wherein said polymer in (a) has a number average molecular weight from about 25,000 to 250,000.

3. The process according to claim 1 wherein said polymer in (a) has a number average molecular weight from about 50,000 to 150,000.

4. The process according to claim 1 wherein said polymer in (a) comprises from about 25 to 75 mole percent ethylene and from about 25 to 75 mole percent of at least one ($C_3$–$C_{10}$) alpha-monoolefin and optionally, about 0 to about 15 mole percent of a polyene selected from non-conjugated dienes and trienes.

5. The process according to claim 1 wherein said polymer in (a) comprises about 50 to 80 mole % ethylene, about 20 to 50 mole % of at least one ($C_3$–$C_{10}$) alpha-monoolefin and, optionally, about 0 to about 15 mole percent of a polyene selected from non-conjugated dienes and trienes.

6. The process according to claim 1 wherein said polymer in (a) comprises from about 25 to 55 mole percent ethylene and from about 45 to 75 mole percent of propylene.

7. The process according to claim 1 wherein said polymer in (a) contains from about 0.1 to 10 mole percent of said polyene.

8. The process according to claim 1 wherein said olefinic carboxylic acid acylating agent is maleic anhydride.

9. The process according to claim 1 wherein said olefinic carboxylic acid acylating agent is itaconic anhydride.

10. The process according to claim 1 wherein said nitrophenyl phenylenediamine is N-(2,4-dinitrophenyl) 1,4-phenylenediamine.

11. The process according to claim 1 further comprising the step of producing a concentrate for a lubricating oil by combining a diluent oil of lubricant viscosity with about 1 to about 50 wt. % of the derivatized graft copolymer obtained in the process of claim 1 based on the total weight of the concentrate.

12. A process for manufacturing a lubricating oil composition comprising mixing a major amount of an oil of lubricating viscosity with a minor amount effective to impart viscosity index improvement, dispersancy, and antioxidant properties to said oil of an additive reaction product prepared by the steps comprising the steps of:

(a) reacting a polymer prepared from ethylene and at least one ($C_3$–$C_{10}$) alpha-monoolefin and, optionally, a polyene selected from non-conjugated dienes and trienes comprising from about 15 to 80 mole percent of ethylene, from about 20 to 85 mole percent of said $C_3$–$C_{20}$ alpha-monoolefin, and from about 0 to about 15 mole percent of said polyene and having a number average molecular weight ranging from about 5,000 to 500,000 with at least one olefinic carboxylic acid acylating agent to from one or more acylating reaction intermediates characterized by having a carboxylic acid acylating function within their structure, and (b) reacting said reaction intermediate in (a) with a nitrophenyl phenylenediamine represented by the formula

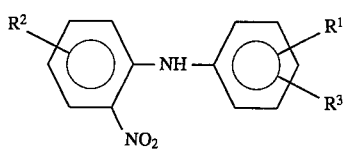

wherein $R^1$ is —$NH_2$, —$CH_2$—$(CH_2)n$—$NH_2$, —$CH_2$—aryl—$NH_2$ in which n has a value from 1 to 10, $R^2$ is a hydrogen or a nitro group, and $R^3$ is hydrogen or a nitro group in the presence of a low molecular weight ethylene oxide polymer.

13. The process according to claim 12 wherein said polymer in (a) has a number average molecular weight ranging from about 25,000 to 250,000.

14. The process according to claim 12 wherein said polymer in (a) has a number average molecular weight ranging from about 50,000 to 150,000.

15. The process according to claim 12 wherein said polymer in (a) comprises about 50 to 80 mole % ethylene, about 20 to 50 mole % of at least one ($C_3$–$C_{10}$) alpha-monoolefin and, optionally, about 0 to about 15 mole percent of a polyene selected from non-conjugated dienes and trienes.

16. The process according to claim 12 wherein said polymer in (a) comprises from about 25 to 55 mole percent ethylene and from about 45 to 75 mole percent of propylene.

17. The process according to claim 12 wherein said polymer in (a) contains from about 0.1 to 10 mole percent of said polyene.

18. The process according to claim 12 wherein the ethylenically unsaturated carboxylic acid material is maleic anhydride.

19. The process according to claim 12 wherein the ethylenically unsaturated carboxylic acid material is itaconic anhydride.

20. The process according to claim 12 wherein said nitrophenyl phenylenediamine is N-(2,4-dinitrophenyl)1,4-phenylenediamine.

* * * * *